US011613177B2

(12) United States Patent
Neumann et al.

(10) Patent No.: US 11,613,177 B2
(45) Date of Patent: Mar. 28, 2023

(54) DROP-BOX TRANSMISSION IN A REDUCED SPACE

(71) Applicant: Deere & Company, Moline, IL (US)

(72) Inventors: Clayton P. Neumann, Cedar Falls, IA (US); Curtis P. Thoreson, Janesville, IA (US); Roger W. Burjes, Cedar Falls, IA (US); Thomas G. Ore, Cedar Falls, IA (US); David King, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 247 days.

(21) Appl. No.: 17/082,641

(22) Filed: Oct. 28, 2020

(65) Prior Publication Data

US 2022/0126686 A1 Apr. 28, 2022

(51) Int. Cl.
*B60K 17/16* (2006.01)
*B60K 17/02* (2006.01)
(Continued)

(52) U.S. Cl.
CPC .............. *B60K 17/16* (2013.01); *B60K 17/02* (2013.01); *B60K 17/08* (2013.01); *B60K 17/22* (2013.01); *B60K 17/28* (2013.01)

(58) Field of Classification Search
CPC ........ B60K 17/16; B60K 17/02; B60K 17/08; B60K 17/22; B60K 17/28; B60K 23/08;
(Continued)

(56) References Cited

U.S. PATENT DOCUMENTS 2,888,998 A * 6/1959 Senkowski ............ B60K 17/28
180/53.4
3,074,285 A * 1/1963 Hausmann ............ F16H 57/038
74/606 R
(Continued)

FOREIGN PATENT DOCUMENTS

DE 69612044 T2 7/2001
DE 69819979 T2 7/2004
(Continued)

OTHER PUBLICATIONS

German Search Report issued in application No. DE102021210551.3, dated Apr. 27, 2022, 12 pages.

*Primary Examiner* — Paul N Dickson
*Assistant Examiner* — Timothy Wilhelm
(74) *Attorney, Agent, or Firm* — Tucker Ellis LLP; Michael G. Craig; Heather M. Barnes

(57) ABSTRACT

One or more techniques and/or systems are disclosed for a transmission that provide power to a front axle, and fits in taller box to provide more room for the transmission. The transmission can comprise a front input shaft that receives rotational power from an engine. A front output shaft is coupled with a front axle to provide the rotational power, conditioned by the transmission, to the front axle. A rear riser gear set can be couple to the rear of the transmission to provide power from the bottom portion of the transmission to a bevel gear set that couples with, and provide rotational power to, a rear axle. In this way, the space between a rear axle centerline and front axle center line can be used by the transmission, allowing for a taller transmission to fit in the chassis.

19 Claims, 8 Drawing Sheets

(51) Int. Cl.
*B60K 17/28* (2006.01)
*B60K 17/22* (2006.01)
*B60K 17/08* (2006.01)

(58) Field of Classification Search
CPC .......... B60K 2023/0825; B60K 17/344; B60Y 2200/221; F16H 1/20
See application file for complete search history.

(56) References Cited

U.S. PATENT DOCUMENTS

| | | | | |
|---|---|---|---|---|
| 3,557,634 | A * | 1/1971 | Bixby | B60K 17/346 180/250 |
| 3,780,821 | A * | 12/1973 | Prange | B60K 17/3462 180/24.09 |
| 4,628,768 | A * | 12/1986 | Omura | F16H 37/043 74/606 R |
| 5,970,809 | A * | 10/1999 | Nam | F16H 37/043 74/331 |
| 6,230,830 | B1 * | 5/2001 | Chorney | B60K 17/105 180/53.6 |
| 6,758,301 | B2 * | 7/2004 | Shiba | B60K 5/1208 464/92 |
| 7,162,853 | B2 * | 1/2007 | Nagai | A01D 69/03 56/10.8 |
| 8,517,139 | B2 * | 8/2013 | Komatsu | B62D 55/14 180/6.66 |
| 9,371,000 | B2 * | 6/2016 | Goleski | B60K 17/28 |
| 9,695,920 | B2 * | 7/2017 | Heindl | B60K 17/356 |
| 9,783,049 | B2 * | 10/2017 | Frait | B60K 17/02 |
| 9,994,102 | B2 * | 6/2018 | Simon | B60K 25/06 |
| 10,435,026 | B2 * | 10/2019 | Shively | F02D 25/00 |
| 10,457,097 | B2 * | 10/2019 | Lubben | B60K 17/046 |
| 10,486,512 | B2 * | 11/2019 | Bassis | B60K 17/354 |
| 10,807,458 | B2 * | 10/2020 | Nishizawa | B60K 6/387 |
| 10,807,459 | B2 * | 10/2020 | Kreis | B60K 6/26 |
| 10,988,193 | B2 * | 4/2021 | Watt | F16D 25/14 |
| 11,072,229 | B2 * | 7/2021 | Hayashi | F16H 57/02 |
| 11,420,512 | B2 * | 8/2022 | Worley | B60K 6/405 |
| 2006/0048977 | A1 * | 3/2006 | Akashima | B62D 25/10 180/6.66 |
| 2010/0107812 | A1 * | 5/2010 | Otten | B60K 17/08 29/893.1 |
| 2012/0181095 | A1 * | 7/2012 | Lopez | B60L 8/003 180/2.2 |
| 2019/0120357 | A1 * | 4/2019 | Han | F16H 3/091 |
| 2019/0346036 | A1 | 11/2019 | Ore et al. | |
| 2021/0170857 | A1 * | 6/2021 | Worley | B60K 6/365 |

FOREIGN PATENT DOCUMENTS

DE 102014009461 A1 12/2014
DE 102016002198 A1 9/2016

* cited by examiner

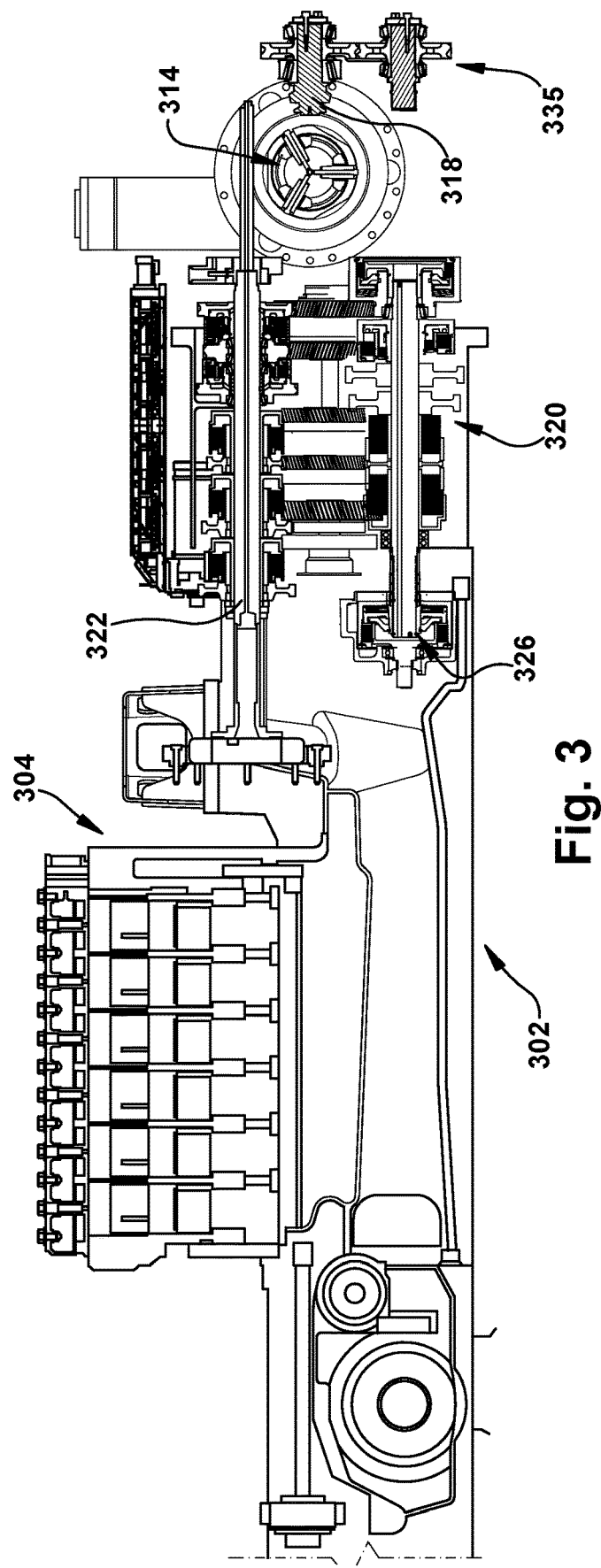

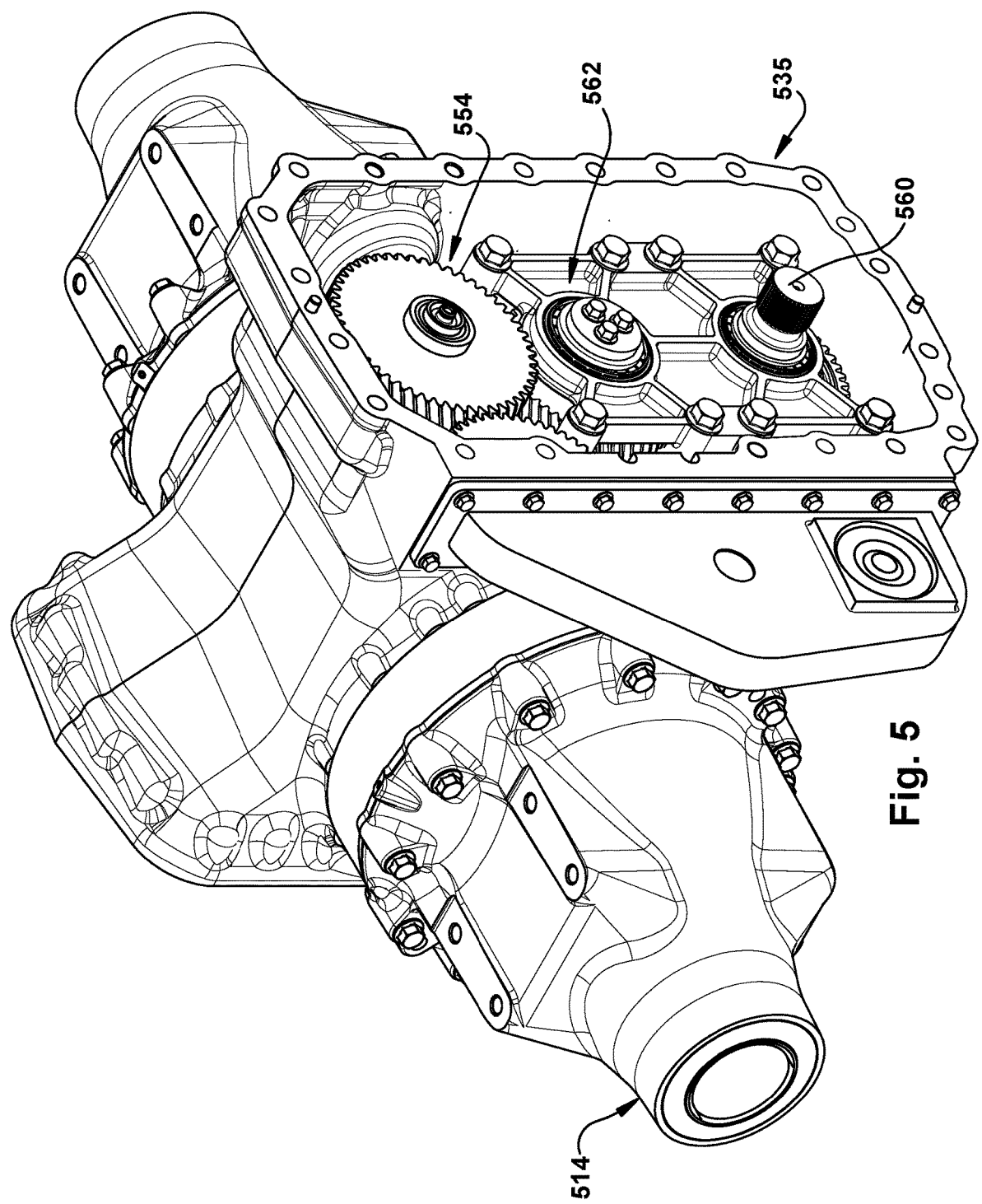

DROP-BOX TRANSMISSION IN A REDUCED SPACE

BACKGROUND

Traditionally, vehicle drivetrains, including tractors, have transmissions that output directly to the rear axle and then a drop gear set that outputs to the front axle. This merely allows the transmission to utilize the engine to rear axle drop and typically results in transmissions that are vertically short, axially long and heavy. The resulting drivetrains are large, heavy, and provide less that desired power density for the weight of the vehicle.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for a transmission that is taller than traditional transmissions found in work-style vehicles, such as tractors and construction equipment. The drop set can be moved to the rear axle, and the transmission can utilize the summation of the engine to rear axle and rear axle to front axle drops. This can result in a transmission that is vertically tall, axially shorter, and lighter, without increasing engine drop, thereby reducing overall drivetrain weight while increasing power density for the vehicle weight. By taking advantage of extra space between the rear axle centerline and the front axle centerline, the power from the transmission can be coupled to the front axle, such as through a drive shaft, instead of to the rear axle. This can allow the power output of the transmission to be disposed at a lower position in the chassis than if it was directed to the rear axle, which allows the transmission to be taller. Further, power can be provided to the rear axle by a rear axle riser, for example, instead of a front axle drop gear set.

In one implementation of a vehicle with a taller transmission, an engine can be coupled with a chassis, where the engine has a crankshaft that is defined by a crankshaft centerline. A front axle can be coupled to the chassis, and is defined by a front axle centerline. A rear axle is coupled to the chassis, and is defined by a rear axle centerline. Further, a transmission is coupled to the chassis between the engine and rear axle. The transmission can comprise a front input shaft that comprises an input shaft axis. The front input shaft can be coupled to the engine to operably receive rotational power from the engine. A front output shaft comprises an output shaft axis. The front output shaft is coupled to the front axle at the front axle centerline to provide power from the transmission to the front axle.

In this implementation, the transmission is dimensioned to operably fit in a vertical drop distance that comprises a vertical distance between the input shaft axis and output shaft axis. Additionally, the vertical drop distance comprises a sum of a front axle vertical drop set and a rear axle vertical drop. The front axle vertical drop-set comprises a distance between the front axle centerline and the rear axle centerline. The rear axle vertical drop comprises a distance between the crankshaft centerline and the rear axle centerline.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

FIG. 3 is a component diagram illustrating an alternate implementation of an example chassis comprising a deeper, drop-box style transmission.

FIG. 5 is a component diagram illustrating an alternate implementation of an example pump drive and rear axle riser, in accordance with one or more systems described herein.

DETAILED DESCRIPTION

Figure 1A:
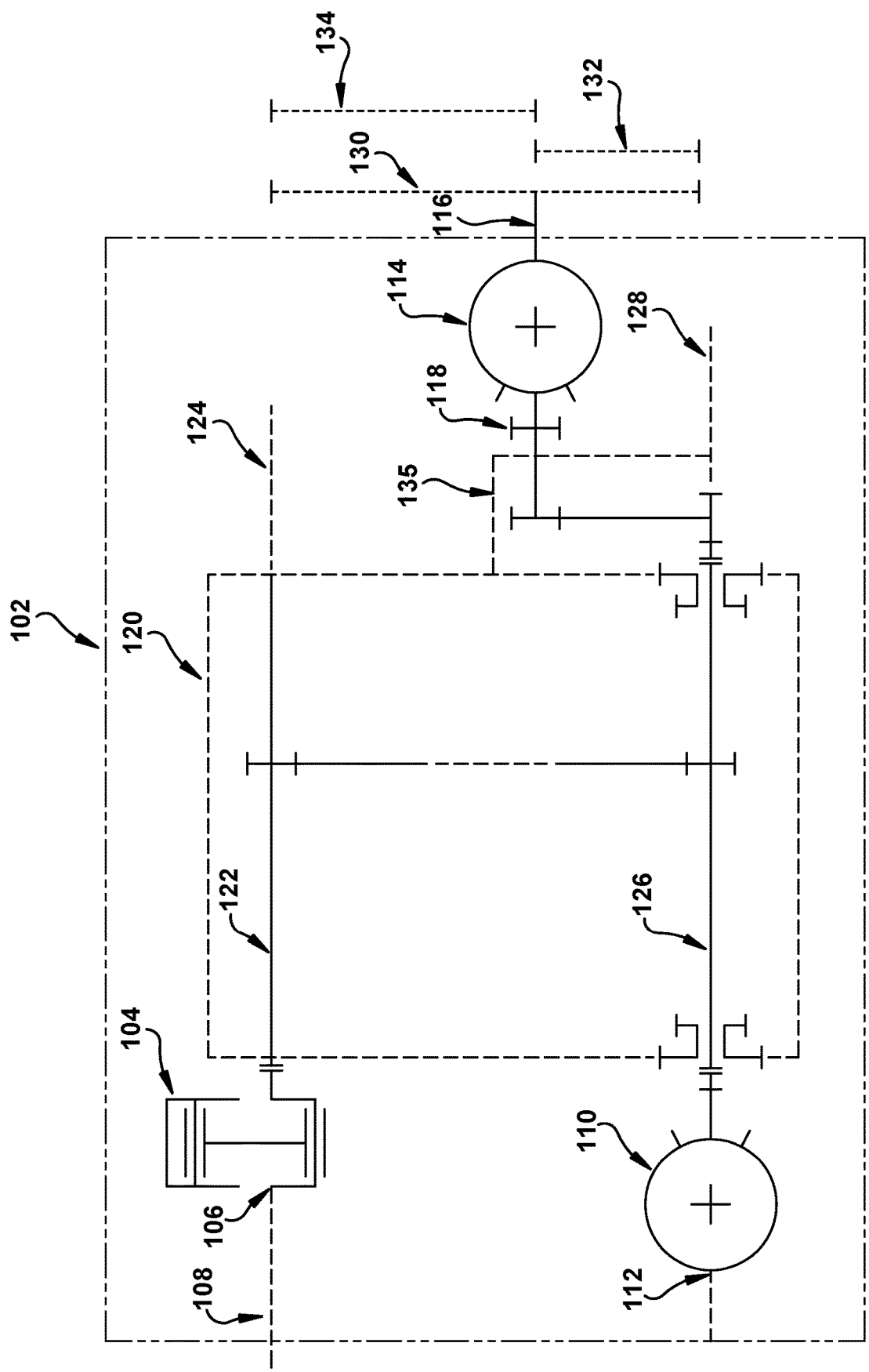
FIGS. 1A and 1B are a schematic diagrams illustrating alternate implementations of an example system where a drop-box style transmission may be utilized.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A vehicle, such as a heavy equipment vehicle (e.g., agricultural, construction), can be devised that provides for space in the chassis to utilize a drop-box style transmission, where the output of the transmission is coupled with, and provides power to, the front axle instead of the rear axle as is found in traditional transmissions. For example, a typical tractor has an engine that provides rotational power to a transmission, which has a rear output shaft that drives a transfer box and a rear axle (e.g., via a rear differential). Further, in this example, the transfer box has a front drive shaft coupled to the front axle. In this example, the transfer box is not part of the transmission, but serves to drop the front drive shaft to the front centerline of the front axle from the centerline or rotational axis of the transmission output shaft. As described herein, the drop-box style transmission can take advantage of space in the chassis that would otherwise be used by the front drive shaft drop, and the space provided by the usually available vertical space between the crankshaft centerline of the engine to the centerline of the rear axle (e.g., which would have otherwise received the transmission output).

That is, for example, a typical transmission fits in the chassis in a space that has a vertical distance between the crankshaft centerline and the rear axle centerline (e.g., which receives the power output). This configuration can limit the height of the transmission, which can limit the style of transmission, for example, creating long transmissions with multiple shafts. Instead, as described herein, a taller transmission can be configured with fewer shafts, by utilizing the vertical space typically used by the drop from the transfer case/box to the front axle. In this aspect, the transmission output can be sent directly to the front axle (e.g., flipped around from the rear axle), at a height that lines up with the front axle centerline. In this way, for example, the drop distance between the rear axle centerline and front axle centerline can be used as additional space for the vertical height of the transmission. Further, a rear-axle riser set can be used to provide power from the transmission to the rear axle, using the rear-axle spiral bevel set.

FIG. 1 schematically illustrates portions of an example powertrain of a vehicle 100, where one or more portions of one or more systems described herein may be implemented. In one implementation, the example vehicle 100 can comprise a chassis 102, that is coupled with an engine 104, a front axle 110 (e.g., front axle assembly, which may or may not include the transaxle, one or more axles, and other parts associated with the assembly), a rear axle 114 (e.g., rear axle assembly, which may or may not include a transaxle, one or more axles, and other parts associated with the assembly) and a transmission 120. In this implementation, the engine 104 comprises a crankshaft 106 that is defined by a crankshaft centerline 108. For example, the crankshaft centerline 108 can align with an axis of rotation of the crankshaft 106, or at least an axis of rotation of a rotational power output portion of the crankshaft 106. The engine 104 is configured to provide rotational power to the powertrain of the vehicle 100.

The front axle 110 is defined by a front axle centerline 112; and the rear axle 114 is defined by a rear axle centerline 116. The centerline of an axle can be considered an axis line of rotation about which wheels coupled to the axle rotate, therefore defining a height relative to the ground (in operation) and chassis, when assembled to the chassis (e.g., and other components assembled with/to the chassis). Further, the rear axle can comprise a rear axle bevel set 118, which can be used to mechanically receive rotational power from the transmission 120. The transmission 120 is coupled to the chassis 102, and is disposed between the engine 104 and rear axle 114.

The transmission comprises a front input shaft 122 that comprises an input shaft axis 124. The front input shaft 122 is coupled to the engine 104 to operably receive rotational power from the engine 104. Further, the transmission comprises a front output shaft 126 that comprises an output shaft axis 128. The front output shaft 128 is coupled to the front axle 110, at the front axis centerline 112 to operably provide rotation power from the transmission 120 to the front axle 110. Additionally, the transmission 120 is dimensioned to operably fit in a vertical drop distance 130 that comprises a vertical distance between the input shaft axis 124 and the output shaft axis 128. In this implementation, the vertical drop distance comprises a sum of a front axle vertical drop-set 132 and a rear axle vertical drop 134. The front axle vertical drop-set 132 comprises a vertical distance between the front axle centerline 112 and the rear axle centerline 116; and the rear axle vertical drop 134 comprises a vertical distance between the crankshaft centerline 108 and the rear axle centerline 116.

In this implementation, the vehicle 100 comprises a rear axle riser set 135 that is coupled with the transmission 120, and also coupled with the rear axle at the rear axle 114 spiral bevel set 118. The rear axle riser set 135 operably provides the rotational power from the transmission 120 to the rear axle 114. For example, the rear axle riser set 135 raises the rotational power from the transmission 120 up to the rear axle 114. In this way, for example, the transmission can have a greater vertical drop than one that has an output substantially at the same level as the rear axle centerline 116. In fact, in this example, the transmission described herein has additional vertical drop space provided by the arrangement of the output at the front, substantially in line with the front axle centerline 112, wherein the rear axle is operably disposed higher (vertically in the chassis) than the front axle. That is, for example, tires used at the rear axle have a much greater diameter than tires used at the front axle, so the front axle will be operably lower than the rear axle. Therefore, in this implementation, disposing the transmission's front output shaft 126 at a substantially same axis as the front axle center line 112 can provide increased space for the vertical drop, and therefore the transmission in the chassis.

Figure 1B:
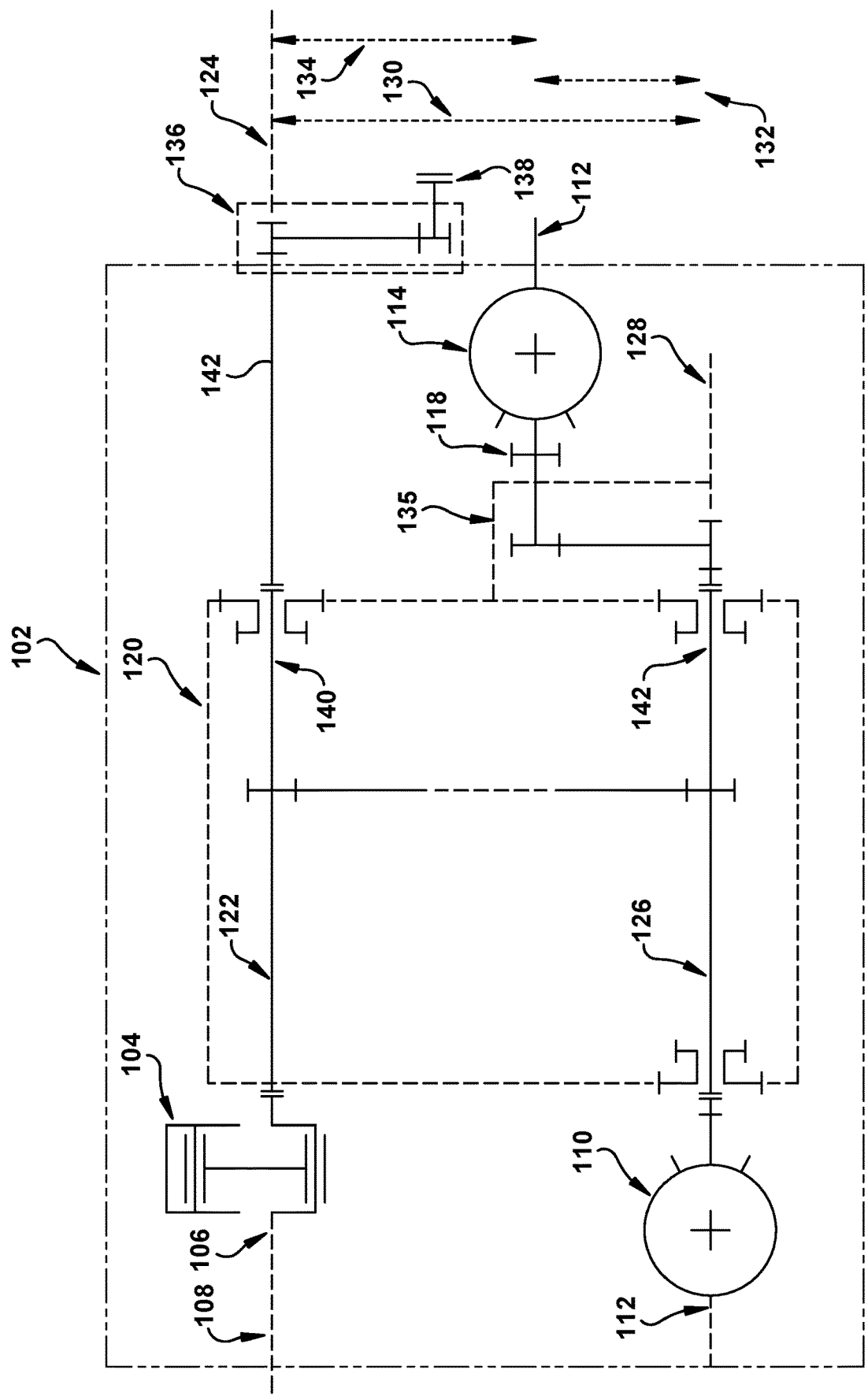

FIG. 1B is a schematic diagram illustrating an alternate implementation of an example powertrain of a vehicle 150, where one or more portions of one or more systems described herein may be implemented with a power take off (PTO) assembly 136. In this implementation, the PTO assembly 136 can be coupled with the transmission 120 using a PTO shaft 142 that is coupled to a upper, rear output shaft 140 of the transmission. Further, the PTO assembly 136 can comprise a PTO output 138 at the rear of the chassis 102. That is, for example, rotational power from the transmission 120 can be provided to the PTO shaft 142 by the upper, rear output shaft 140. In this example, the rotational power is provided to the PTO output 138 by the PTO assembly 136. As an example, the PTO assembly can comprise a gear assembly that transfers power from the height of the input shaft axis 124 down to the PTO output 138. It should be appreciated that the PTO output 138 can be disposed at any desired height at the rear of the chassis 102, in conjunction with the PTO assembly 136. Additionally, in this implementation, the transmission can comprise a lower, rear output shaft 142, that is operably coupled with the rear axle riser set 135 to operably provide the rotational power from the transmission 120 to the rear axle 114.

Figure 2:
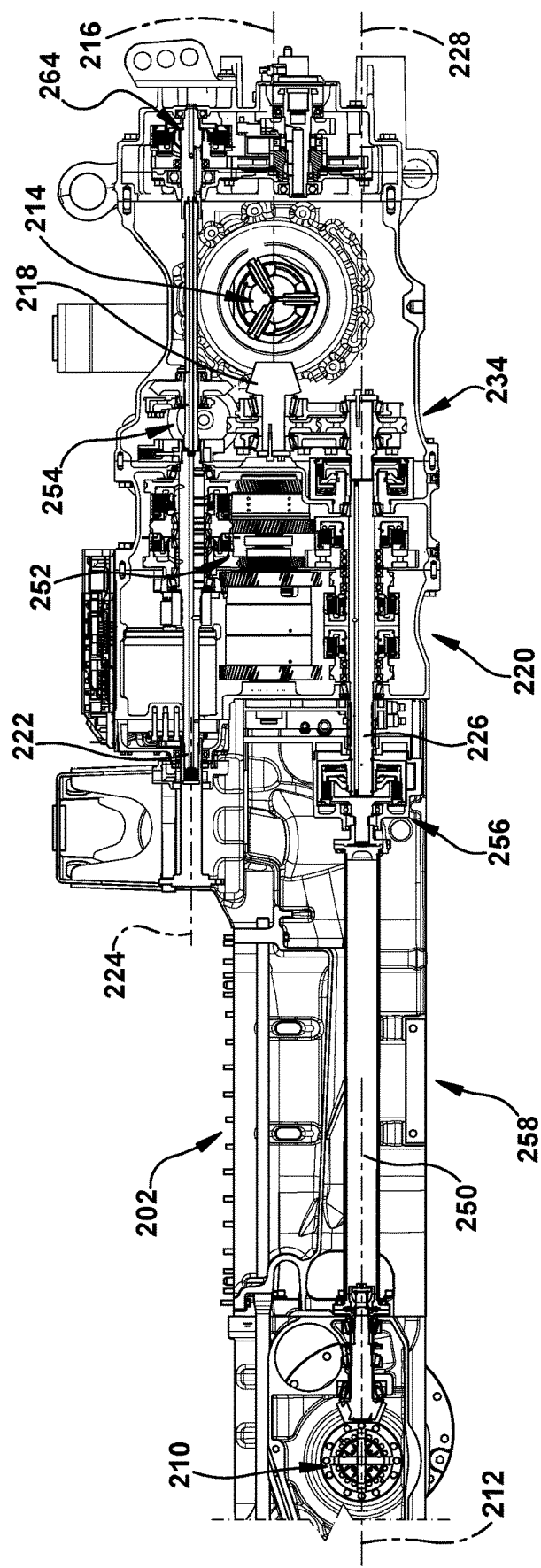
FIG. 2 is a component diagram illustrating one implementation of an example chassis comprising a deeper, drop-box style transmission.

In some implementations, the rear axle riser set can be disposed forward of the rear axle, and rearward of the transmission; and the rear axle spiral bevel set can be disposed at a forward side of the rear axle. As an illustrative example, FIG. 2 is a component diagram illustrating an example implementation 200 of one or more portions of one or more systems described herein. In this example implementation 200, the transmission 220 has a front input shaft 222 that is operably rotational around an input shaft axis 224. Further, the transmission 220 has a front output shaft 226 that is operably rotational around an output shaft axis 228. Additionally, the front output shaft 226 is operably coupled with the front axle 210 at, and substantially aligned with, the front axle centerline 212. In this example, a front drive shaft 250 can operably couple the front output shaft 226 to the front axle 210 (e.g., using a front bevel gear set).

As illustrated, the rear axle riser set 235 is disposed between the transmission 220 and the rear axle 214. The rear riser set 235 is operably coupled to the rear of the transmission, and rises up, and is operably coupled with the rear axle spiral bevel set 218 at, and substantially aligned with, the rear axle centerline 216. The rear axle spiral bevel set 218 operably transmits rotational power from the bottom, rear of the transmission 120, through the rear axle riser set 235, to the rear axle 214. Further, as illustrated in FIG. 2, in this example implementation 200 a transmission pump drive 254 can be operably coupled with the transmission 220. For example, the transmission pump drive 254 can provide power to a transmission pump, such as to pump transmission fluid around portions of the transmission 220 during operation. In some implementations, as illustrated herein, the transmission pump drive 254 can be disposed in a perpendicular axis with respect to the axis of rotation 224 of the input shaft 222. In some implementations, the transmission pump drive 254 can be disposed above the rear axle centerline 216, rearward of the transmission 220.

In some implementations, as illustrated in FIG. 2, the example system 200 can comprise a front wheel drive clutch 256 (e.g., a mechanical front wheel drive (MFWD) clutch). The front wheel drive clutch 256 can be disposed between the front output shaft 226 and the front drive shaft 250 to transition the rotational power between the front output shaft 226 and the front drive shaft 250, as needed. In some implementations, the MFWD clutch comprises springs that can be applied and released using hydraulic power or other actuators to appropriately transition the rotational power. In some implementations, the positioning of the transmission 220 with the drive shaft 250 in the front of the chassis 202 provides for an elongated oil pan 258.

In some implementations, as illustrated in FIG. 2, the example system 200 can comprise a power take off (PTO) 264. In these implementations, the PTO 264 can comprise a single mesh PTO that is disposed above the rear axle riser 325, and coupled with the rear of the transmission 220 substantially in line with the front input shaft axis 224. As an example, the PTO 264 can provide rotational power to a PTO couple disposed at the rear of the vehicle chassis 202.

Therefore, as an example, an engine (not shown) can generate rotational power, which is transmitted to the crankshaft (not shown) of the engine, rotating around a crankshaft centerline. In this example, the crankshaft can be operably coupled to the front input shaft 222, to operably transmit the rotational power created by the engine to the transmission 220. The transmission 220, through a series of gears and clutches 252, can transmit that rotational power to the front output shaft 226. Further, the front output shaft 226 is operably coupled to the front axle 210, for example, through a drive shaft 250, to transmit the rotational power to the front axle to provide powered rotation of the front axle (e.g., and attached wheels). Additionally, the rotational power from the transmission 220 can be transmitted to the rear axle riser set 235, which transmits that rotation, for example, through a series of gears, to the rear axle spiral bevel set 218, to the rear axle. In this way, in this example, rotational power can be provided to the rear axle 214 to power rotation of the rear axle 214 (e.g., and attached wheels).

In some alternate implementations, the rear axle riser set can disposed rearward of the rear axle. In this implementation, the rear axle spiral bevel set is disposed at a rearward side of the rear axle. As an illustrative example, FIG. 3 is a component diagram of an alternate example implementation 300 illustrating one or more portions of one or more systems described herein. As illustrated, in this example 300, a rear axle riser set 335 can be disposed rearward of the rear axle 314. In this example, the rear axle riser set 335 can be coupled to the transmission 320, such as using a rear drive shaft (not shown). For example, the front output shaft 326 can be operably coupled to a rear drive shaft that is coupled to the rear axle riser set 335 to provide rotational power to the rear axle riser set 335. In this way, for example, the transmission 320 may be disposed further backward in the chassis 302 (e.g., than in example 200), and proximate the rear axle 314, when the rear axle riser set 335 is disposed rearward of the rear axle 314. As an example, this may provide more room in the chassis for the engine 314, the input shaft 322, and/or other components of an example vehicle.

Figure 4A:
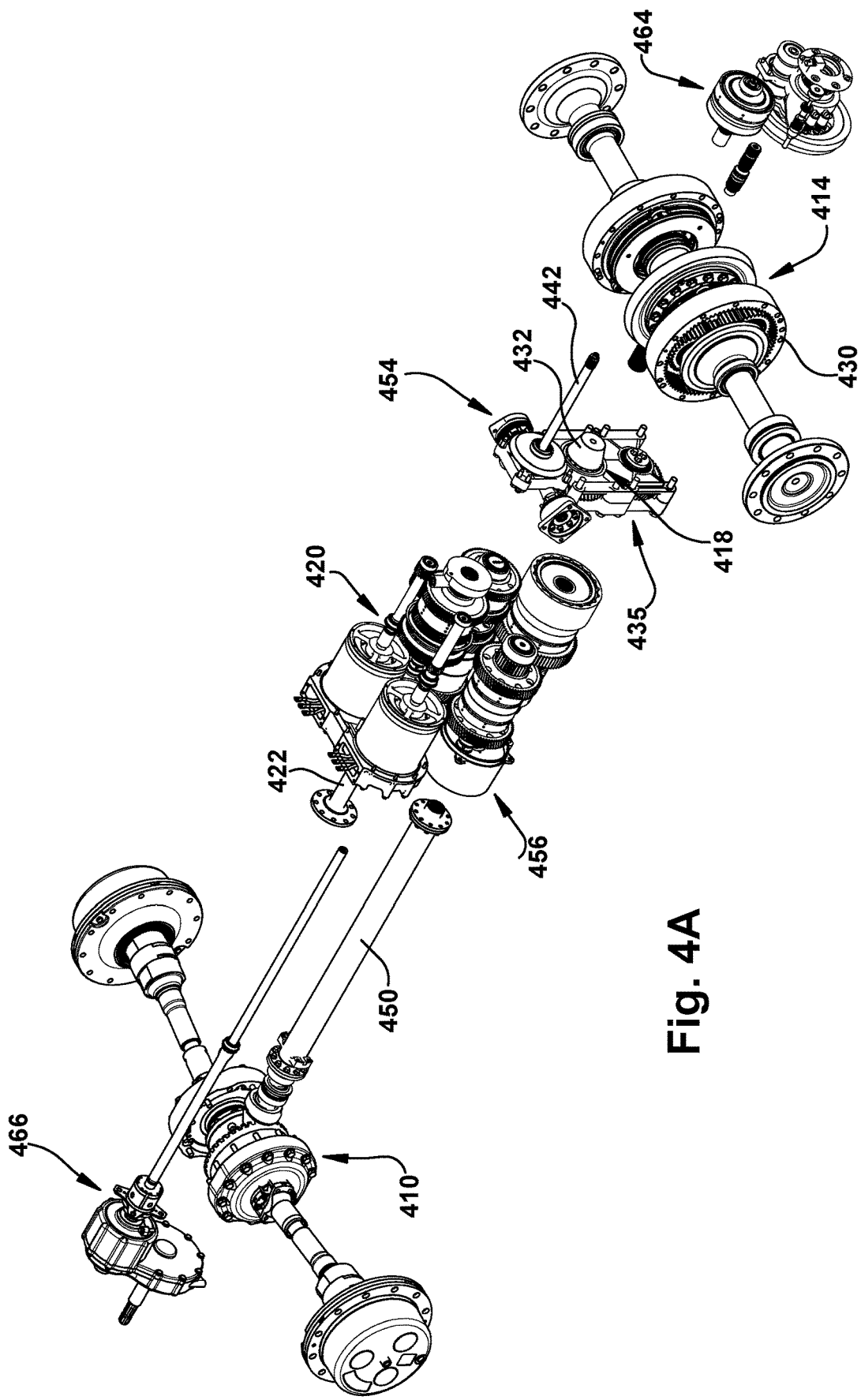
FIGS. 4A and 4B are component diagrams illustrating an exploded view of one implementation of one or more portion of one or more systems described herein.
Figure 4B:
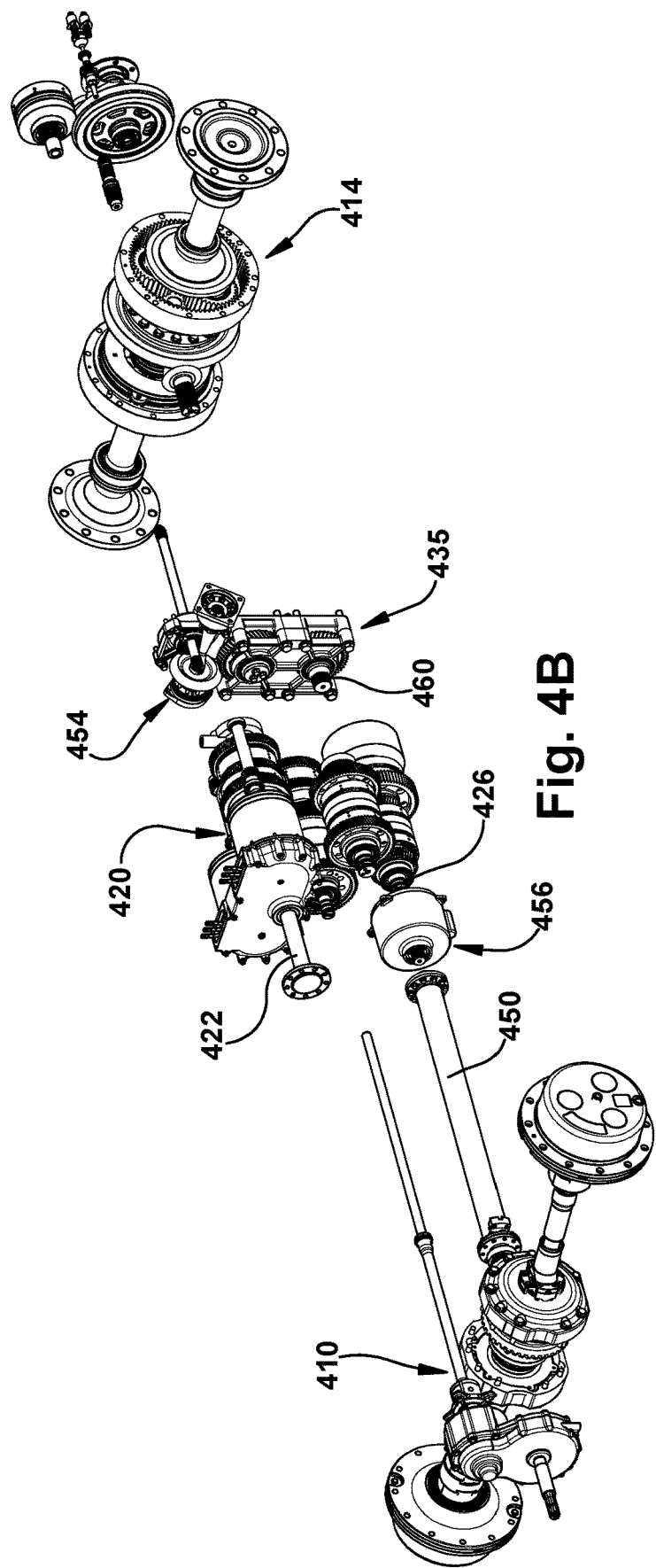

FIGS. 4A and 4B are component diagrams illustrating alternate, exploded perspective views of one or more portions of systems described herein. As illustrated, the transmission 420 comprises a front input shaft 422 and a front output shaft 426. For example, the front output shaft 422 receives rotational power from an engine (not shown), and the front output shaft 426 outputs the rotational power (e.g., as conditioned by the transmission 420) to the front drive shaft 450. The front drive shaft 450 is coupled to the front axle 410 to provide the rotational power to the front wheels, for example. Further, in this example, a front wheel drive clutch 456 can be disposed between the front output shaft 426 and the front drive shaft 450.

Further, in this example, a rear axle riser set 435 is disposed rearward of the transmission 420. In some implementations, the rear axle riser set 435 is disposed between the transmission and the rear axle 414. In other implementations, the rear axle riser set 435 can be disposed rearward of the rear axle 414. In some implementations, the rear axle riser set 435 can comprise a transmission coupling gear set 460 that operably couples the rear axle riser set 435 with the transmission 410. The rear axle riser set 435 operably couples with a rear axle bevel gear set 418, which operably couples with the rear axle 414 to provide rotational power to the rear wheels. As an example, the rear axle bevel gear set 418 can comprise a pinion gear 432 that operably couples with a ring gear 430 in the rear axle 414.

In this implementation, a transmission pump drive 454 can be operably disposed in, and rotate around, a perpendicular axis to that of the input drive shaft 422. Further, in some implementations, a rear PTO 464 can be coupled to the transmission 420, for example proximate the pump drive 454 (e.g., above). The rear PTO 464 receives rotational power from the transmission 420, using a PTO shaft 442, and provides the power to a rear PTO coupler (e.g., PTO output 138), such as to couple to attached equipment (e.g., cutters, etc.). Additionally, a front PTO 466 can be disposed at the front of the chassis to provide rotational power to a front coupler, such as coupled to a front attachment (e.g., front hydraulic pump, etc.). The front PTO 466 can be coupled with the engine or the transmission to receive the rotational power. In some implementations, the PTO (e.g., 464) can comprise a multiple-speed (e.g., or 2, 3, 4, etc., speed) PTO, for example, using a variable gear set that allows for adjustment of the rotational speed of the PTO output.

FIG. 5 is a component diagram illustrating an alternate implementation of an example pump drive and riser portion 500 of a system described herein. In this implementation, the example pump drive and riser portion 500 comprises a rear axle riser 535, which can be disposed between the rear axle 514 and the transmission of a chassis (not shown); or, alternately, rearward of the rear axle 514. In another implementation, the example pump drive and riser portion 500 can be disposed in front of the transmission (e.g., 420 of FIGS. 4A, 4B). In the rear axle riser 535, a transmission coupling gear set 560 is operably disposed in substantial alignment with the front output shaft axis (e.g., 228 of FIG. 2), and can be coupled with the rear of the transmission to receive rotary power. In this example, the rotary power is transmitted (e.g., through gears) to a riser power output 562 for the rear axle riser 535. In operation, the riser power output 562 can be coupled with the bevel gear set (e.g., 218 of FIG. 2), to provide the rotary power to the rear axle 514. Further, in this example implementation, a parallel axis pump drive 554 can be disposed above, and on a frontward side of the riser power output 562 and rear axle spiral bevel. In this example, the parallel axis pump drive 554 has one or more gears that rotate around an axis parallel to the axis of rotation of the input shaft (e.g., 222), and the transmission coupling gear set 560, in contrast to a perpendicular pump drive (e.g., 254 of FIG. 2).

Figure 6:
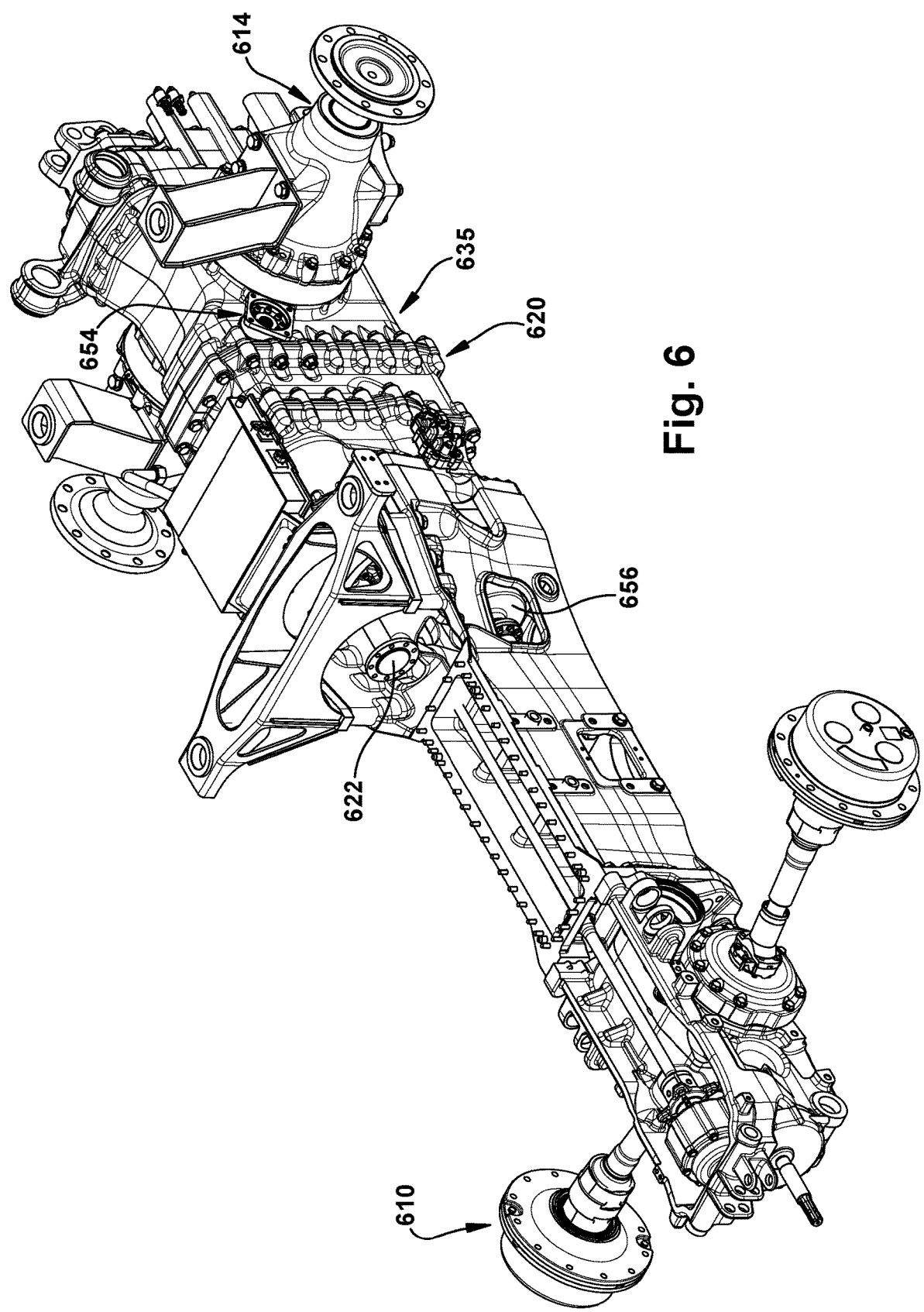
FIG. 6 is a component diagram illustrating one implementation of one or more portion of one or more systems described herein.

FIG. 6 is a component diagram illustrating an example implementation of a vehicle chassis 600 comprising one or more portions of one or more systems described herein. In this implementation, a front axle 610, a rear axle 614, and transmission 620 are engaged with the chassis 600. A front input shaft 622 can be couple with an engine (not shown) to provide rotary power to the transmission 620. A front output shaft (not shown) can be coupled to the MFWD 656, which can be coupled to a front drive shaft to provide the rotational power (e.g. conditioned by the transmission 620) to the front axle 610. Further, a rear axle riser gear 635 can be coupled to the rear of the transmission 620 to provide the rotational power to the rear axle 614, through the rear axle bevel gear set (not shown). Additionally, a gear pump drive 654 can be disposed above the rear axle riser set 635, to provide power to a transmission pump (not shown).

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A vehicle comprising:
   a chassis;
   an engine coupled to the chassis and comprising a crankshaft defined by a crankshaft centerline;
   a front axle coupled to the chassis and defined by a front axle centerline;
   a rear axle coupled to the chassis and defined by a rear axle centerline, and comprising a rear axle spiral bevel set;
   a transmission coupled to the chassis, and disposed between the engine and rear axle, the transmission comprising:
   a front input shaft, comprising an input shaft axis, the front input shaft coupled to the engine and operably receiving rotational power from the engine;
   a front output shaft, comprising an output shaft axis, the front output shaft coupled to the front axle at the front axle centerline and operably providing the rotational power from the transmission to the front axle;
   wherein the transmission is dimensioned to operably fit in a vertical drop distance comprising a vertical distance between the input shaft axis and the output shaft axis; and
   wherein the vertical drop distance comprises a sum of a front axle vertical drop-set, comprising a distance between the front axle centerline and the rear axle centerline, and a rear axle vertical drop, comprising a distance between the crankshaft centerline and the rear axle centerline; and
   a transmission pump drive disposed above the rear axle centerline, rearward of the transmission.

2. The vehicle of claim 1, comprising a rear axle riser set coupled with the transmission and coupled with the rear axle at the rear axle spiral bevel set and operably providing the rotational power from the transmission to the rear axle.

3. The vehicle of claim 2, the rear axle riser set disposed forward of the rear axle, and rearward of the transmission, wherein the rear axle spiral bevel set is disposed at a forward side of the rear axle.

4. The vehicle of claim 2, the rear axle riser set disposed rearward of the rear axle, wherein the rear axle spiral bevel set is disposed at a rearward side of the rear axle.

5. The vehicle of claim 2, the rear axle riser set coupled with the transmission at the rearward side of the transmission along the output shaft axis.

6. The vehicle of claim 1, the transmission pump drive comprising a perpendicular drive having a rotation around an axis that is perpendicular to the input shaft axis.

7. The vehicle of claim 6, the transmission pump drive comprising a parallel drive having a rotation around an axis that is parallel to the input shaft axis.

8. The vehicle of claim 1, comprising a rear single mesh power take off (PTO) operably engaged with the rear of the transmission to selectably provide rotational power to a PTO coupler at the rear of the chassis.

9. The vehicle of claim 1, comprising a front wheel drive clutch operably coupled to the front output shaft to control rotational power output to the front axle.

10. The vehicle of claim 9, comprising a front drive shaft operably coupled to, and disposed between, the front axle and the front wheel drive clutch.

11. A power train for a vehicle that has a chassis, a front axle defined by a front axle centerline axis, and rear axle defined by a rear axle centerline axis, the power train comprising:
    an engine with a crankshaft defined by a crankshaft centerline axis;
    a transmission, disposed between the engine and rear axle, the transmission comprising:
        a front input shaft operably rotating around an input shaft axis, the front input shaft operably coupled to the engine to receive rotational power; and
        a front output shaft operably rotating around an output shaft axis, the front output shaft operably coupled to the front axle at the front axle centerline to provide the rotational power from the transmission to the front axle; and
    a transmission pump drive disposed above the rear axle centerline, rearward of the transmission
    wherein the transmission is dimensioned to have a vertical drop distance that operably fits in the chassis, the transmission's vertical drop distance comprising a vertical distance between the input shaft axis and the output shaft axis; and
    wherein the vertical drop distance comprises a sum of a front axle vertical drop-set, comprising a vertical distance between the front axle centerline and the rear axle centerline, and a rear axle vertical drop, comprising a vertical distance between the crankshaft centerline and the rear axle centerline.

12. The power train of claim 11, comprising a rear axle riser set coupled with the transmission and coupled with the rear axle at a rear axle spiral bevel set, and operably providing the rotational power from the transmission to the rear axle.

13. The vehicle of claim 12, the rear axle riser set disposed forward of the rear axle, and rearward of the transmission, wherein the rear axle spiral bevel set is disposed at a forward side of the rear axle.

14. The vehicle of claim 12, the rear axle riser set disposed rearward of the rear axle, wherein the rear axle spiral bevel set is disposed at a rearward side of the rear axle.

15. The vehicle of claim 11, comprising a rear single mesh power take off (PTO) operably engaged with the rear of the transmission to selectably provide rotational power to a PTO coupler at the rear of the chassis.

16. The vehicle of claim 11, comprising a front wheel drive clutch operably coupled to the front output shaft to control rotational power output to the front axle.

17. The vehicle of claim 11, comprising a front drive shaft operably coupled to, and disposed between, the front axle and the front wheel drive clutch.

18. A vehicle comprising:
    a chassis;
    an engine coupled to the chassis and comprising a crankshaft defined by a crankshaft centerline;
    a front axle coupled to the chassis and defined by a front axle centerline;
    a rear axle coupled to the chassis and defined by a rear axle centerline, and comprising a rear axle spiral bevel set;
    a transmission coupled to the chassis, and disposed between the engine and rear axle, the transmission comprising:
        a front input shaft, comprising an input shaft axis, the front input shaft coupled to the engine and operably receiving rotational power from the engine; and
        a front output shaft, comprising an output shaft axis, the front output shaft coupled to the front axle at the front axle centerline and operably providing the rotational power from the transmission to the front axle;
        wherein the transmission is dimensioned to operably fit in a vertical drop distance comprising a vertical distance between the input shaft axis and the output shaft axis; and
        wherein the vertical drop distance comprises a sum of a front axle vertical drop-set, comprising a distance between the front axle centerline and the rear axle centerline, and a rear axle vertical drop, comprising a distance between the crankshaft centerline and the rear axle centerline;
    a transmission pump drive disposed above the rear axle centerline, rearward of the transmission, the transmission pump comprising one of:
        a perpendicular drive having a rotation around an axis that is perpendicular to the input shaft axis; and
        a parallel drive having a rotation around an axis that is parallel to the input shaft axis;
    a rear axle riser set coupled with the transmission and coupled with the rear axle at the rear axle spiral bevel set and operably providing the rotational power from the transmission to the rear axle; and
    a front wheel drive clutch operably coupled to the front output shaft to control rotational power output to the front axle.

19. The vehicle of claim 18, comprising one of:
    the rear axle riser set disposed forward of the rear axle, and rearward of the transmission, wherein the rear axle spiral bevel set is disposed at a forward side of the rear axle;
    the rear axle riser set disposed rearward of the rear axle, wherein the rear axle spiral bevel set is disposed at a rearward side of the rear axle; and
    the rear axle riser set coupled with the transmission at the rearward side of the transmission along the output shaft axis.

* * * * *